Patented Jan. 19, 1954

2,666,709

UNITED STATES PATENT OFFICE 2,666,709

STABILIZATION OF EDIBLE OILS AND FATS

Robert H. Rosenwald, Western Springs, and Joseph A. Chenicek, Riverside, Ill., assignors to Universal Oil Products Company, Chicago, Ill., a corporation of Delaware No Drawing. Application October 24, 1945,
Serial No. 624,318

21 Claims. (Cl. 99—163)

This invention relates to the stabilization of edible oils and fats and more particularly to the inhibition of the development of rancidity therein.

Many compounds are known which will prevent the development of rancidity in edible oils and fats but practically all of them are unsuitable because they are either toxic and therefore cannot be used for stabilizing the edible oils and fats, or else they impart bad odor and taste to such oils and fats. Some of these compounds are so volatile they are removed from the oils and fats during cooking or in deep fat frying, while others are relatively insoluble in oils and fats.

A very important feature of an inhibitor for the stabilization of oils and fats is that the inhibitor carries over into the bakery products. Many bakery products as, for example, crackers, are kept for considerable periods of time in factories, stores or in the homes, before consumption. These bakery goods tend to become rancid due to these long periods of storage. While some of the known inhibitors are very potent when used in edible oils and fats, they do not have this important property of carrying over into the bakery goods and therefore are not completely satisfactory for the purpose intended. It is the object of the present invention to provide a novel class of inhibitors which will retard deterioration of edible oils and fats and also will retard the development of rancidity in the bakery goods.

In one specific embodiment the present invention relates to a process for stabilizing edible oils and fats against rancidity which comprises incorporating therein a minor portion of a compound having the general structure

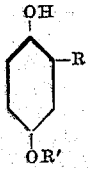

wherein R and R' are alkyl groups.

In another specific embodiment the present invention relates to edible oils and fats normally tending to become rancid having incorporated therein a small amount of a compound having the general structure hereinbefore set forth.

The edible oils and fats which may be stabilized in accordance with the present invention are generally of animal and vegetable origin. Merely as typical representatives, the following are mentioned; linseed oil, menhaden oil, cod liver oil, caster oil, olive oil, rapeseed oil, coconut oil, palm oil, corn oil, sesame oil, peanut oil, babassu oil, butter, fat, lard, beef tallow, etc., as well as hydrogenated oils and fats such as are sold under various trade names including "Crisco," "Snowdrift," etc. It is understood that other oils and fats may be treated within the scope of the present invention, including oils and fats which have previously been subjected to various treatments, such as blowing with air, heat treatment, etc.

The novel inhibitor of the present invention comprises 2-alkyl-4-alkoxy phenols of the general structure

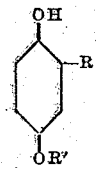

wherein R and R' are alkyl groups.

The alkyl groups substituted in the ring may comprise any alkyl groups such as methyl, ethyl, propyl, isopropyl, butyl, isobutyl, sec-butyl, tert-butyl, amyl, isoamyl, sec-amyl, tert-amyl, etc. Of these groups the tert-alkyl groups appear to be more effective in contributing to the inhibitor potency of the resultant compound. Likewise, the groups of higher molecular weight contribute to other desirable properties of the inhibitor. The substituent group is preferably in the position ortho to the hydroxyl group. Some compounds having alkyl groups in the meta position may also have inhibiting value.

Particularly potent inhibitors comprise those in which the alkoxy or ether group is in the 4-position. The alkyl group of this alkoxy substituent may comprise, for example, methyl, ethyl, propyl, isopropyl, butyl, isobutyl, sec-butyl, tert-butyl, amyl, iso-amyl, sec-amyl, tert-amyl, etc., and may be the same or different from the other alkyl substituent groups. In general, it may be said that the alkoxy groups of relatively low molecular weight, comprising methoxy or ethoxy groups, appear to have the strongest influence, although the other groups have considerable value.

The novel inhibitor of the present invention may be prepared in any suitable manner. One particularly convenient method of preparing the inhibitor consists in alkylating a hydroquinone ether and particularly a mono-alkyl ether with an olefin acting substance including an olefin, alcohol, ether, etc. For example, hydroquinone-monomethyl ether may be reacted at a temperature of 75 to 80° C. with a tertiary alcohol corresponding to the group to be substituted, using 85% phosphoric acid as the catalyst. The reaction mixture is stirred continuously until the reaction is complete. The mixture is then washed with water to remove the remaining acid and is extracted with 10% sodium hydroxide solution to remove the unreacted hydroquinone ether. The insoluble portion is distilled under reduced temperature and the resulting compound may be further purified by recrystallization.

The inhibitor of the present invention is added to the oils and fats in amounts of less than 1% by weight and generally below 0.01%. In most instances the amount of inhibitor utilized will be in the range of 0.0001% to 0.01%.

The following example is introduced to illustrate further the novelty and utility of the present invention but not with the intention of unduly limiting the same.

The inhibitor of the present invention was utilized in stabilizing lard which had a stability period of 5 hours as determined by the Swift test. This test is described in detail in the article by A. E. King, H. L. Roschen and W. H. Irwin, which appeared in the "Oil and Soap," vol. X, No. 6, pages 105 to 109 (1933). In general, this test comprises bubbling air through a sample of the lard until rancidity is determined organoleptically and by peroxide values.

0.005% by weight of 2-tert-butyl-4-methoxyphenol added to the lard increased the period of stability to 23 hours. The inhibitor was prepared by reacting tertiary butyl alcohol with hydroquinone mono-methyl ether at 80° C. in the presence of phosphoric acid catalyst. While it is difficult to actually correlate the period of rancidity as determined by this test with the days or months of storage in factories, stores or homes, it is generally considered that a stability period of 20 hours is usually sufficient for all practical purposes. One of the reasons why it is so difficult to make this correlation is that the subsequent storage, and particularly in homes, is under varying conditions of temperature and humidity. For example, in some homes, the oils and fats may be placed in a spot exposed to the sun and thereby may be subjected to this heat or the oils may be placed in a damp atmosphere and thereby be adversely affected.

An important property of the inhibitor of the present invention is that it carries over with the lard into the bakery goods and thereby retards the development of rancidity therein. In general, the bakery goods are tested for rancidity primarily by tasting, and it has been found that the bakery goods prepared with lard containing this inhibitor remained free from rancidity for a considerably longer period of time than the same bakery goods prepared with lard to which the inhibitor of the present invention had not been added. As hereinbefore set forth, this property is an important feature of inhibitors for edible oils and fats. For example, hydroquinone, which otherwise is a good inhibitor for edible oils and fats, does not carry over into the bakery goods and therefore is not as satisfactory for commercial use.

We claim as our invention:

1. A process for stabilizing edible fatty oils and fats against rancidity which comprises incorporating therein a small amount of a compound having the general structure

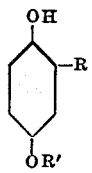

where R is a tert-butyl group and R' is an alkyl group of not more than five carbon atoms.

2. A process for stabilizing edible fatty oils and fats against rancidity which comprises incorporating therein a small amount of a compound having the general structure

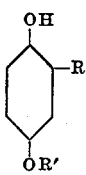

where R is a tertiary alkyl group and R' is an alkyl group of less than three carbon atoms.

3. A process for stabilizing edible oils and fats against rancidity which comprises incorporating therewith a small amount of 2-tert-butyl-4-methoxy phenol.

4. A process for stabilizing oils and fats against rancidity which comprises incorporating therewith a small amount of 2-tert-butyl-4-ethoxyphenol.

5. A process for stabilizing edible oils and fats against rancidity which comprises incorporating therewith a small amount of 2-tert-amyl-4-methoxy phenol.

6. Edible fatty oils and fats normally tending to become rancid having incorporated therewith, in an amount sufficient to retard rancidity development, an inhibitor having the general structure

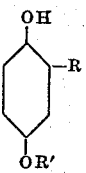

where R is a tertiary alkyl group and R' is an alkyl group of less than three carbon atoms.

7. Edible oils and fats normally tending to become rancid having incorporated therein, in an amount sufficient to retard rancidity development, 2-tert-butyl-4-methoxy phenol.

8. Edible oils and fats normally tending to become rancid having incorporated therein, in an amount sufficient to retard rancidity development, 2-tert-butyl-4-ethoxy phenol.

9. Edible oils and fats normally tending to become rancid having incorporated therein, in an amount sufficient to retard rancidity development, 2-tert-amyl-4-methoxy phenol.

10. A method of stabilizing animal and vegetable fats and oils against rancidity which comprises incorporating therein a small amount of a 2-tertiary-alkyl-4-alkoxyphenol.

11. A method of stabilizing animal and vegetable fats and oils against rancidity which comprises incorporating therein a small amount of a 2-tertiary-butyl-4-alkoxyphenol.

12. A method of stabilizing animal and vegetable fats and oils against rancidity which comprises incorporating therein a small amount of 2-tertiary-butyl-4-methoxyphenol.

13. A method of stabilizing animal and vegetable fats and oils against rancidity which comprises incorporating therein a small amount of 2-tertiary-butyl-4-ethoxyphenol.

14. Animal and vegetable fats and oils normally tending to become rancid having incorporated therein a small amount of a 2-tertiary-alkyl-4-alkoxyphenol.

15. Animal and vegetable fats and oils normally tending to become rancid having incorporated therein a small amount of a 2-tertiary-butyl-4-alkoxyphenol.

16. Animal and vegetable fats and oils normally tending to become rancid having incorporated therein a small amount of 2-tertiary-butyl-4-methoxyphenol.

17. Animal and vegetable fats and oils normally tending to become rancid having incorporated therein a small amount of 2-tertiary-butyl-4-ethoxyphenol.

18. As a composition of matter, lard containing a small amount of a 2-tertiary-alkyl-4-alkoxyphenol.

19. As a composition of matter, lard containing a small amount of a 2-tertiary-butyl-4-alkoxyphenol.

20. As a composition of matter, lard containing a small amount of 2-tertiary-butyl-4-methoxyphenol.

21. As a composition of matter, lard containing a small amount of 2-tertiary-butyl-4-ethoxyphenol.

ROBERT H. ROSENWALD.
JOSEPH A. CHENICEK.

References Cited in the file of this patent

UNITED STATES PATENTS

| Number | Name | Date |
| --- | --- | --- |
| 2,050,689 | Briod | Aug. 11, 1936 |
| 2,124,749 | Salzberg | July 26, 1938 |
| 2,131,904 | Salzberg | Oct. 4, 1938 |
| 2,138,924 | Jones | Dec. 6, 1938 |
| 2,315,858 | Johnston | Apr. 6, 1943 |